(12) United States Patent
Park et al.

(10) Patent No.: US 9,794,606 B2
(45) Date of Patent: Oct. 17, 2017

(54) TRANSMISSION OF DIGITAL CONTENT TO SELECT DEVICES

(71) Applicant: Samsung Electronics Co., Ltd., Gyeonggi-do (KR)

(72) Inventors: Sangmi Park, Gyeonggi-do (KR); Hyunho Park, Seoul (KR); Jupyo Hong, Gyeonggi-do (KR)

(73) Assignee: Samsung Electronics Co., Ltd., 129 Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/264,184

(22) Filed: Apr. 29, 2014

(65) Prior Publication Data

US 2014/0325554 A1    Oct. 30, 2014

(30) Foreign Application Priority Data

Apr. 29, 2013 (KR) ................. 10-2013-0047367

(51) Int. Cl.
| | | |
|---|---|---|
| *H04N 21/258* | (2011.01) | |
| *H04N 21/435* | (2011.01) | |
| *H04N 21/4405* | (2011.01) | |
| *H04N 21/4408* | (2011.01) | |
| *H04N 21/6334* | (2011.01) | |
| *H04N 21/835* | (2011.01) | |

(Continued)

(52) U.S. Cl.
CPC ....... *H04N 21/25816* (2013.01); *G06F 21/10* (2013.01); *H04L 63/061* (2013.01);
(Continued)

(58) Field of Classification Search
CPC .. H04N 21/6334; H04N 21/06; H04N 21/431; H04N 21/436; H04N 21/4788; H04N 21/63775; H04N 21/643; H04N 21/25816; H04N 21/835; H04N 21/26613; H04N 21/4405; H04N 21/4408; H04N 21/4353; H04N 21/475; H04N 21/482; H04L 63/061; H04L 63/10; G06F 21/10;
(Continued)

(56) References Cited

U.S. PATENT DOCUMENTS 6,539,479 B1 * 3/2003 Wu ............................. 713/151
7,499,551 B1    3/2009 Mire
(Continued)

FOREIGN PATENT DOCUMENTS

EP    2 523 476 A1    11/2012
KR    10-2010-0105872 A    9/2010

OTHER PUBLICATIONS

High-Bandwidth Digital Content Protection System, Revision 1.3, Dec. 21, 2006; Digital Content Protection LLC.*

(Continued)

*Primary Examiner* — Benjamin R Bruckart
*Assistant Examiner* — Tien M Nguyen
(74) *Attorney, Agent, or Firm* — Cha & Reiter, LLC

(57) ABSTRACT

Disclosed herein are a method and device for transmitting digital content. A selection of at least one device authorized to receive digital content is detected. It is identified whether each selected device contains a session key that corresponds to a local session key. Digital content is transmitted to each device whose session key corresponds to the local key. Digital content is prevented from transmission to unselected devices not having a corresponding session key.

19 Claims, 7 Drawing Sheets

(51) Int. Cl.
*H04N 21/266* (2011.01)
*G06F 21/10* (2013.01)
*H04L 29/06* (2006.01)

(52) U.S. Cl.
CPC ....... *H04L 63/10* (2013.01); *H04N 21/26613* (2013.01); *H04N 21/4353* (2013.01); *H04N 21/4405* (2013.01); *H04N 21/4408* (2013.01); *H04N 21/6334* (2013.01); *H04N 21/835* (2013.01)

(58) Field of Classification Search
CPC .. G06F 21/445; G06F 21/606; G06F 21/6209; H06F 21/33
See application file for complete search history.

(56) References Cited

U.S. PATENT DOCUMENTS

| | | | |
|---|---|---|---|
| 8,547,342 B2* | 10/2013 | Stallings | G06F 3/04883 345/173 |
| 2003/0163684 A1* | 8/2003 | Fransdonk | G06Q 20/12 713/153 |
| 2004/0009778 A1 | 1/2004 | Makuta | |
| 2005/0005000 A1* | 1/2005 | Yoshimoto | 709/220 |
| 2006/0008256 A1* | 1/2006 | Khedouri | G06F 17/30038 386/234 |
| 2008/0019276 A1* | 1/2008 | Takatsuji et al. | 370/236 |
| 2008/0134309 A1 | 6/2008 | Qin et al. | |
| 2009/0178086 A1 | 7/2009 | Unger | |
| 2009/0296938 A1* | 12/2009 | Devanand et al. | 380/278 |
| 2010/0103316 A1* | 4/2010 | Colsey et al. | 348/552 |
| 2010/0175098 A1* | 7/2010 | Zustak et al. | 725/109 |
| 2011/0013772 A1* | 1/2011 | Roethig | H04N 21/4367 380/200 |
| 2011/0228715 A1* | 9/2011 | Tsuji et al. | 370/310 |
| 2013/0322496 A1* | 12/2013 | Park et al. | 375/219 |

OTHER PUBLICATIONS

High-Bandwidth Digial Content Protection System—Mapping HDCP to HDMI, Revision 2.2, Feb. 13, 2013, Digital Protection LLC.*

* cited by examiner

TRANSMISSION OF DIGITAL CONTENT TO SELECT DEVICES

CLAIM OF PRIORITY

This application claims the benefit under 35 U.S.C. §119(a) of a Korean patent application filed on Apr. 29, 2013 in the Korean Intellectual Property Office and assigned Serial No. 10-2013-0047367, the entire disclosure of which is hereby incorporated by reference.

TECHNICAL FIELD

The present disclosure relates to wireless communication and, in particular, to a method and electronic device for transmitting digital content.

BACKGROUND

With the rapid advance of network technologies and diversification of digital content (e.g. music, video, game, software, and document), the use of digital content has become increasingly popular. This tendency has raised concerns about protecting digital content and managing technology for preventing illegal copying and redistribution of paid digital content.

For example, the High-bandwidth Digital Content Protection (HDCP) is a technology designed to prevent illegal duplication of video data transferred through Digital Visual Interface (DVI). An HDCP-enabled device may be capable of encrypting and decrypting video data for playback of high quality content in compliance with HDCP protocol.

HDCP technology has recently evolved so as to be adopted to all bidirectional communication including wireless and compressed transmission independently of other interface standards such as DVI, High-Definition Multimedia Interface (HDMI), and DisplayPort. The HDCP technology includes a locality check protocol for restricting the receipt of the digital content to devices within a predetermined radius. However, since the locality check protocol establishes communication with any device that sends a response signal within a predetermined time, digital content may be transmitted to a device not intended to receive the digital content.

SUMMARY

In view of the above, the present disclosure aims to provide a method and device that prevents session establishment with an unintended recipient, such that unintended recipients do not receive the digital content.

In accordance with an aspect of the present disclosure, a method for transmitting digital content may comprise displaying a list of devices authorized to receive digital content, the devices being within a predetermined radius of a sender device; detecting a selection of at least one of the devices authorized to receive digital content; identifying whether each selected device contains a session key that corresponds to a local session key, in response to the selection; transmitting digital content to each device whose session key corresponds to the local session key; and preventing transmission of the digital content to each device not containing a corresponding session key.

In accordance with another aspect of the present disclosure, a user device is provided. The user device may include a communication unit; a display unit; a control unit to: display, on the display unit, a list of devices authorized to receive digital content, the devices being within a predetermined radius of the user device; detect a selection on the display unit of at least one of the devices authorized to receive digital content; identify whether each selected device contains a session key that corresponds to a local session key, in response to the selection; transmit, using the communication unit, digital content to each device whose session key corresponds to the local session key; and prevent transmission of the digital content to each device not containing a corresponding session key.

DETAILED DESCRIPTION

Figure 1:
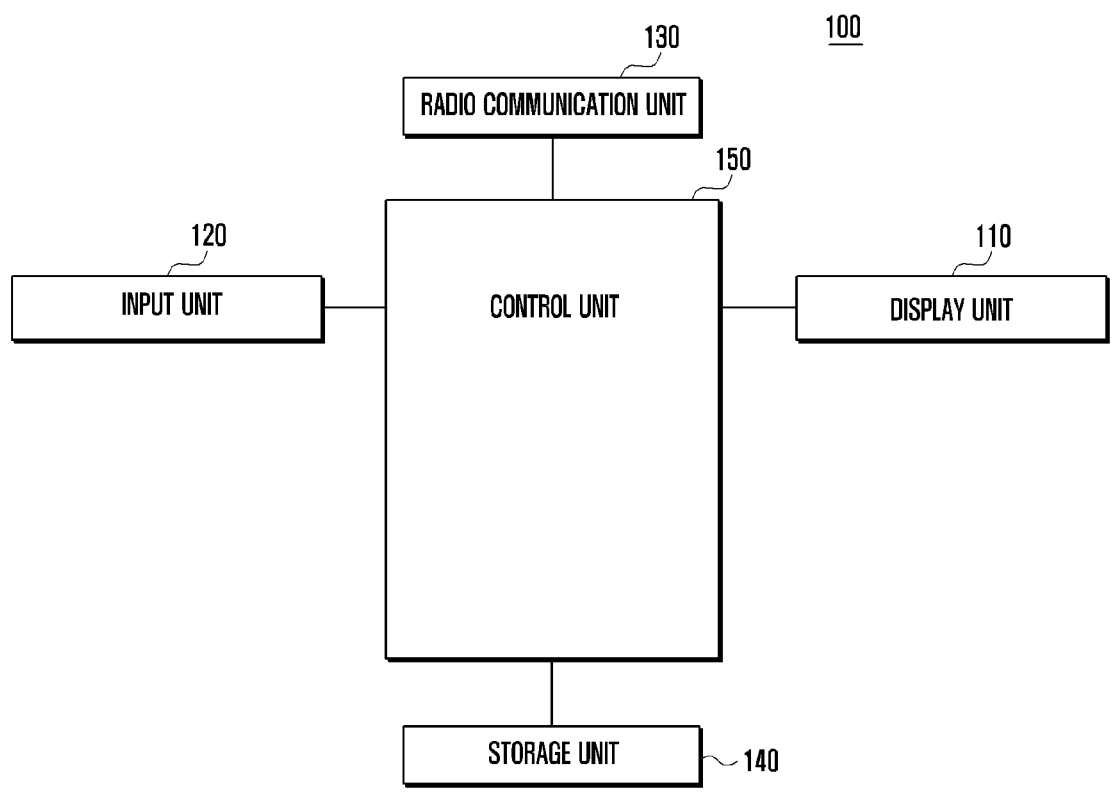
FIG. 1 is a block diagram illustrating an example configuration of the user device in accordance with aspects of the present disclosure.

The present disclosure is described in detail with reference to the accompanying drawings. The terms and words used in this description and the appended claims are not to be interpreted in common or lexical meaning but, based on the principle that an inventor can adequately define the meanings of terms to best describe the disclosure, to be interpreted in the meaning and concept conforming to the technical concept of the present disclosure. Thus, it should be understood that there may be various equivalents and modified examples that can replace the embodiments described in the present specification and the configuration shown in the drawings at the time of filling the present application. In the drawings, certain elements may be exaggerated or omitted or schematically depicted for clarity of the disclosure, and the actual sizes of the elements are not reflected. Thus, the present disclosure is not limited in the relative sizes of the elements and distances therebetween.

In the following description, the user device may be any device having computing resources such as smartphone, tablet Personal Computer (PC), laptop PC, digital camera, computer monitor, Personal Digital Assistant (PDA), media player, audio device, gaming console, and electronic appliance (e.g. Television (TV)).

In the following description, the user device may operate with enhanced HDCP protocol so as to transmit video content to the recipient devices selectively in a wireless communication environment.

The user devices authorized to receive digital content (e.g. video content) are displayed on a source device. Furthermore, at least one recipient device may display the content received from the source device. Here, the source device may be a terminal which sends an authentication request to a recipient device in order to protect the transmitted content. In turn, the recipient device may respond to the authentication request.

The user device may support an Orthogonal Frequency Division Multiplexing (OFDM) based digital content (e.g. video content) transmission/reception function and wireless communication protocol-based HDCP. The user device may be capable of validating whether the recipient device is authorized to receive the encrypted content in compliance with the HDCP protocol. If the validation is successful, the user device may transmit the encrypted content to the recipient device. The recipient device may decrypt the encrypted content and display the decrypted content in compliance with the decoding rule of the HDCP protocol.

Transmitting the content from the source device to the recipient device may include 1) authenticating the source and recipient devices mutually, 2) encrypting the content to be transmitted, and 3) updating a list of devices to which content transmission is either blocked or permitted.

In one example, the information associated with recipient devices within a predetermined radius of the source device may be collected. In a further example, the source device may display the collected information to the user and may establish a session with each recipient device selected by the user and ignore the unselected recipient devices.

While the examples herein refer to content transmission from the perspective of the source device, it is understood that the examples herein may also be applicable to the recipient devices. In the following description, the terms 'user device' and 'source device' may be used interchangeably.

FIG. 1 is a block diagram illustrating a configuration of the user device in accordance with aspects of the present disclosure. In FIG. 1, the user device may include a display unit 110, an input unit 120, a radio communication unit 130, a storage unit 140, and a control unit 150. The display unit 110 may display various screens associated with the operation of the user device. The display unit 110 may convert the video data from the control unit 150 to an analog signal for display on the screen. The display unit 110 may include a display panel for displaying various screens associated with the operation of the user device and a touch panel arranged on a surface of the display panel to generate an input event. The display unit 110 may switch between the landscape mode and the portrait mode according to the rotating direction (or orientation) of the user device.

In one example, a response signal may be received by the source device in response to a round trip delay time (RTT) signal. The response signal may be received within a predetermined time. The display unit 110 may display identity information associated with at least one recipient device located within a predetermined radius of the source device in accordance with the RTT signal. The control unit 150 may instruct display unit 110 to display the identity information on the user device in the form of, for example, a popup window The input unit 120 may generate various input signals necessary for the operation of the user device. The input unit 120 may generate a signal associated with the user configuration and device function control to the control unit 150. The control unit 150 may control the function of the user device in response to the input signal. In the case that the display unit 110 is embedded with a touch panel, the display unit 110 may operate as a part of the input unit 120. In this case, the input signal for operating the user device may be generated by means of the touch panel.

The radio communication unit 130 may be responsible for communication of the user device. The radio communication unit 130 may establish a communication channel with a corresponding mobile communication network for voice, video, and data communication. The radio communication unit 130 may include a Radio Frequency (RF) receiver for low noise amplifying and down-converting the received signal.

The radio communication unit 130 may include at least one of High Definition Multimedia Interface (HDMI) module, a Bluetooth module, a Wireless Local Area Network (WLAN) module (or Wi-Fi module), a ZigBee module, a Wi-Fi Direct module, and a Near Field Communication (NFC) module. In one example, the radio communication unit 130 may transmit/receive a control signal, message, device information, and encrypted digital content in the authentication procedure with at least one recipient device. While the description is directed to the authentication procedure using the radio communication unit, it is understood that the authentication procedure with the recipient device may be performed through a wire connection.

The storage unit 140 may store an Operating System (OS) of the device, various applications (or App), data generated in the device. The data may include all the types of data such as application data generated by the applications running on the device and received from remote sources (e.g. external servers, other devices, and personal computers that can be stored in the device. The storage unit 140 may store the user interface provided by the device and various configuration informations for executing functions. The storage unit 140 may be implemented with at least one of a disc, Random Access Memory (RAM), Read Only Memory (ROM), and flash memory or the like.

In one example, the storage unit 140 may store unique encryption key information for use in supporting HDCP technology. The encryption key information may include a Key Selection Vector (KSC) comprising a public key and a plurality of private keys.

The control unit 150 may manage the overall operation of the user device and the signal flows among the internal components of the device and may process data. The control unit 150 may manage the power supply from the battery to the internal components. If the device power is turned on, the control unit 150 may initiate the booting process of the user device and execute various application programs stored in the program region to activate the functions of the user device in accordance with a user's configuration.

In a further example, the control unit 150 may manage the operations for transmitting/receiving protected digital content. The control unit 150 may authenticate the recipient devices located within a predetermined radius in response to a user request or in accordance with a predetermined schedule. Control unit 150 may determine whether each recipient device is authorized to receive the digital content (e.g. content encrypted in compliance with the HDCP protocol). If any recipient device meets the predetermined authentication conditions, the control unit 150 may encrypt the content for protection. The control unit 150 may also transmit the digital content to the authenticated recipient device.

Figure 2:
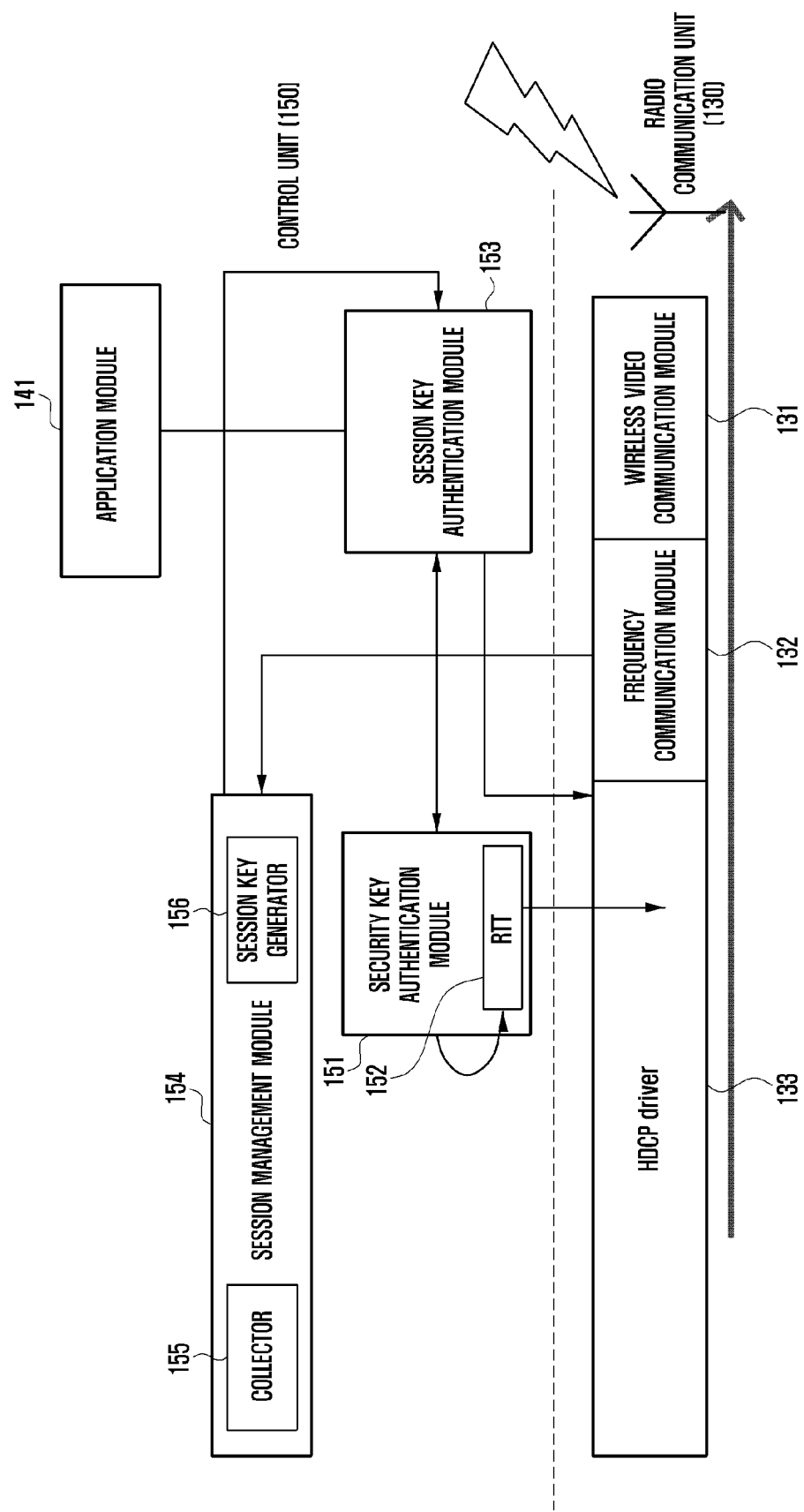
FIG. 2 is a block diagram illustrating an example configuration of the control unit of FIG. 1.

A detailed description of control unit 150 is made hereinafter with reference to FIG. 2. FIG. 2 is a block diagram illustrating a configuration of the control unit depicted in FIG. 1. As shown in FIG. 2, the control unit 150 may include a security key authentication (Authentication and Key Exchange: AKE) module 151, a session key authentication (Session Key Exchange) module 153, and a session management (HASS) module 154. The security key authentication module 151 may connect to the session key authentication module 153, the radio communication unit 130, and the storage unit 140. If an authentication request for a recipient device is made, the security key authentication module 151 may exchange the security key with the recipient device in compliance with the HDCP protocol specification. The security key authentication module 151 may send the radio communication unit 130, e.g. HDCP driver 133, a security key message with the public key of the encryption key information stored in the storage unit 140. The radio communication unit 130 may transmit the security key message received from the security key authentication module 151 to the recipient devices within a predetermined radius of the source device and may receive a response message, the response message being transferred to the security key authentication module 151. The security key authentication module 151 may check the security key of the recipient device in the response message to determine whether the public key of the recipient device is valid. If it is determined that the public key is valid, the security key authentication module 151 may transmit an RTT signal using the RTT signal module 152.

The RTT signal module 152 may send the RTT signal to a recipient device that satisfies the security key authentication and may determine whether a response signal is received form any recipient device within a predetermined time (e.g. 0.7 ms). If any recipient device transmits the response signal within the predetermined time, the RTT signal module 152 may determine that the recipient device is authenticated such that a session with the RRT-authenticated recipient device may be established. In one example, the predetermined time may correspond to the predetermined radius. Here, a session may be established when the user device and the recipient device mutually recognize their presence. Establishing a session may comprise a locked wireless communication channel between the source device and the recipient device. Therefore, a recipient device that has passed security key and RTT authentication may then go through a session key authentication process for direct data transmission.

The session key authentication module 153 may connect to the session management module 154, the storage unit 140, and the radio communication unit 130. Session key authentication module 153 may exchange session keys with the recipient device selected by the user for authentication. Session key authentication module 153 may generate a session key based on a public key and its own private key or local session key. After generating the session key, session key authentication module 153 may transfer the generated key to radio communication unit 130. In turn, radio communication unit 130 may transmit the local session key to the recipient device. Radio communication unit 130 may then receive a response from the recipient device after sending the session key and may transfer the response to session key authentication module 153. Session key authentication module 153 may determine whether the session key received from the recipient device corresponds to its local session key, which was generated by session key authentication module 153. In one example, the session keys may correspond to each other when the session keys match. In another example, the session keys may correspond to each other if they are mathematically symmetrical (e.g., via modular arithmetic or via a hash function, etc.). If session key authentication module 153, determines that the session keys correspond to each other, then the session key authentication process is deemed successful and the session is established. Once the session is established, session key authentication module 153 may send the digital content to wireless video communication module 131 of radio communication unit 130. The digital content may be generated by application module 141. Radio communication unit 130 may transmit the digital content to the session key-authenticated recipient device.

The session management module 154 may connect to radio communication unit 130 and session key authentication module 153. Session management module 154 may include a collector 155 and a session key generator 156. The collector 155 may collect the identity information associated with a recipient device that has passed the security key authentication and RTT authentication. In one example, the identity information may be the Extended Display Identification Data (EDID) associated with a recipient device, but it is understood that the identity information could be any other type of suitable data. In a further example, the EDID may include the manufacturer ID and product ID of the recipient device. If information associated with a plurality of devices is collected, collector 155 may analyze the information in accordance with a predetermined configuration to determine which recipient has the highest priority. In this example, the recipient device having the highest priority may be automatically selected in accordance with a user's configuration. For example, the recipient device with the highest priority may be the device closest to the source device or may be the device with the largest display.

The session management module 154 may control frequency communication module 132 of radio communication module 130, to read the EDID received from the recipient device or request the EDID from the recipient device.

Session management module 154 may display the recipient device information via display unit 110 and may select the recipient device in response to a user input selection. The session management module 154 may maintain the session with recipient device(s) selected by the user and block a session with recipient devices that were unselected by the user.

The session key generator 156 may generate the session key based on the identity information associated with the recipient device selected by the user. In one example, the session key may be a secret key generated based on the public key of the recipient device and the private key of the source device.

Although it is difficult to enumerate all the functional components and configurations, the user device 100 may include other components not shown, such as a sensor module for detecting information regarding the change in location of user device 100, a GPS module for measuring the location of the user device 100, and a camera module. Naturally, the user device 100 may be implemented with or without these components.

Figure 3:
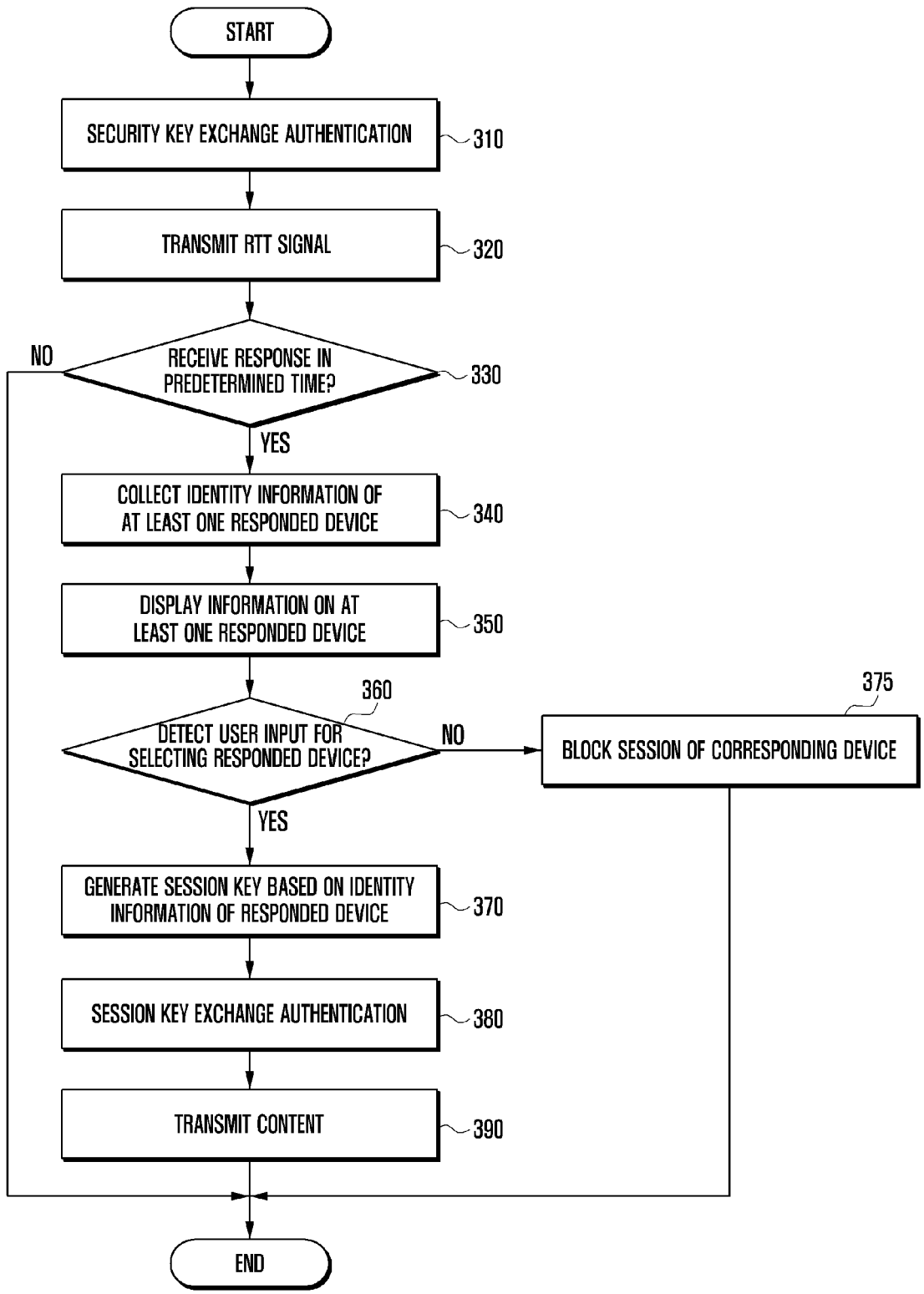
FIG. 3 is a flowchart illustrating an example method in accordance with aspects of the present disclosure.

FIG. 3 is a flowchart illustrating an example method in accordance with aspects of the present disclosure. In FIG. 3, the source device may execute a first authentication by exchanging a security key with the recipient device in accordance with HDCP protocol, at block 310. In one example, the security key may include an HDCP key, but it is understood that other keys may be employed. For example, an HDCP-enabled device may have an encryption key set and a Key Selection Vector (KSC) including one public key and a plurality of private keys.

In the first authentication procedure, the source device may send the public key AKsv to recipient devices within a predetermined radius of the source device, and the recipient devices may send the source device a BKsv in response to the message. If there are a plurality of HDCP-enabled recipient devices within the predetermined radius of the source device, the source device may authenticate each recipient device successfully. That is, the source device may support one-to-many communication as well as one-to-one communication.

The source device may send the recipient devices located within the predetermined radius an RTT signal in accordance with a second authentication process, if the recipient devices pass the first authentication process successfully, at block 320. The RTT may be the time required for a packet transmitted by the source device to arrive at the recipient device and for a response packet transmitted by the recipient device to arrive at the source device.

In block 330, the source device may determine whether the response signal transmitted by a recipient device in response to the RTT signal arrives in a predetermined time (e.g. 0.7 ms). In particular, if a response signal is received from a recipient device in the predetermined time, the source device may acknowledge that the recipient device has passed the second authentication. Otherwise, the source device may determine that the recipient device has failed the second authentication. The source device may collect the identity information associated with at least one recipient device that passed the second authentication, at block 340. As noted above, the identity information may be an EDID associated with the recipient device. The EDID may include the manufacturer ID and product ID of the recipient device. The source device may read the EDID from the recipient device or request the EDID from the recipient device. The EDID may also include information indicating the display properties of the digital device in addition to the manufacturer ID and product ID.

The source device may display the collected recipient device information at block 350. The recipient device information may be displayed in the form of, for example, a popup window or screen. The user may view the type of recipient devices within a predetermined radius of the user device based on the information displayed on display unit 110. That is, the user may view the type of recipient devices within a predetermined radius that are authorized to receive digital content. In one example, a recipient device is authorized when it passes the first and second authentication described above.

If the information is received from only one recipient device, the source device may display a message notifying of the connection with the recipient device accompanied by a selection item.

In the case that the recipient device information is received from a plurality of authorized recipient devices within the predetermined radius, the source device may generate a list of the recipient devices. The recipient device list allows the user to select a recipient device to perform a third authentication procedure with the selected recipient device.

In a further example, if the recipient device information is collected from a plurality of recipient devices, the source device may analyze the recipient device information to determine the recipient device having the highest priority, in accordance with a predetermined configuration. The source device may display the highest priority recipient device information via display unit 110.

The recipient device having the highest priority may be the device specified by the user in a user configuration. In another example, the highest priority device may be the recipient device closest to the source device or the recipient device having the largest display. The recipient device closest to the source device may be determined through the RTT signal authentication procedure. The source device also may select the recipient device having the largest display size based on an EDID that indicates the display size information provided by the manufacturer's server.

The source device may detect a user input for selecting a certain recipient device, at operation 360. The user may select a recipient device from a recipient device list displayed on the screen of display unit 110. Although a plurality of recipient devices may pass the first and second authentication successfully, the user may select one recipient device from the recipient device list. That is, a device may be authorized to receive digital content but may be an unselected device. The source device may detect the selection input made by the user and determine the recipient device with which the third authentication will be performed, in response to the user's selection. The source device maintains the session with the selected recipient device and prevents or blocks any session with an authorized recipient device that is not selected by the user, at block 375.

The source device may generate a session key based on the identity information of the recipient device selected by the user at block 370. In this example, the session key may be the secret key generated based on the public key of the recipient device and the private key of the source device.

The source device may perform a third authentication process by exchanging the session key with the selected recipient device at block 380. In the third authentication procedure, the source device may generate the local session key Km based on the public key of the selected recipient device and the private key of the source device. At the same time, a selected recipient device may also generate a session key Km' based on the public key of the source device and a private key of the selected recipient device. The selected recipient device may transmit Km' to the source device in response to a message received from the source device which includes Km. If the source device confirms that Km and Km' correspond to each other (e.g., they match or they are mathematically symmetrical), the source device may deem the selected recipient device to have passed the third authentication process. These session keys may be used for decrypting the encrypted content for display.

The source device may send the protected digital content to each recipient device which has passed the third authentication successfully, at block 390. The source device may encrypt the content using an HDCP encryption engine. The source device may also may also compare the KSVs of the authenticated recipient devices with the KSVs included in the System Renewability Message (SRM).

Figure 4:
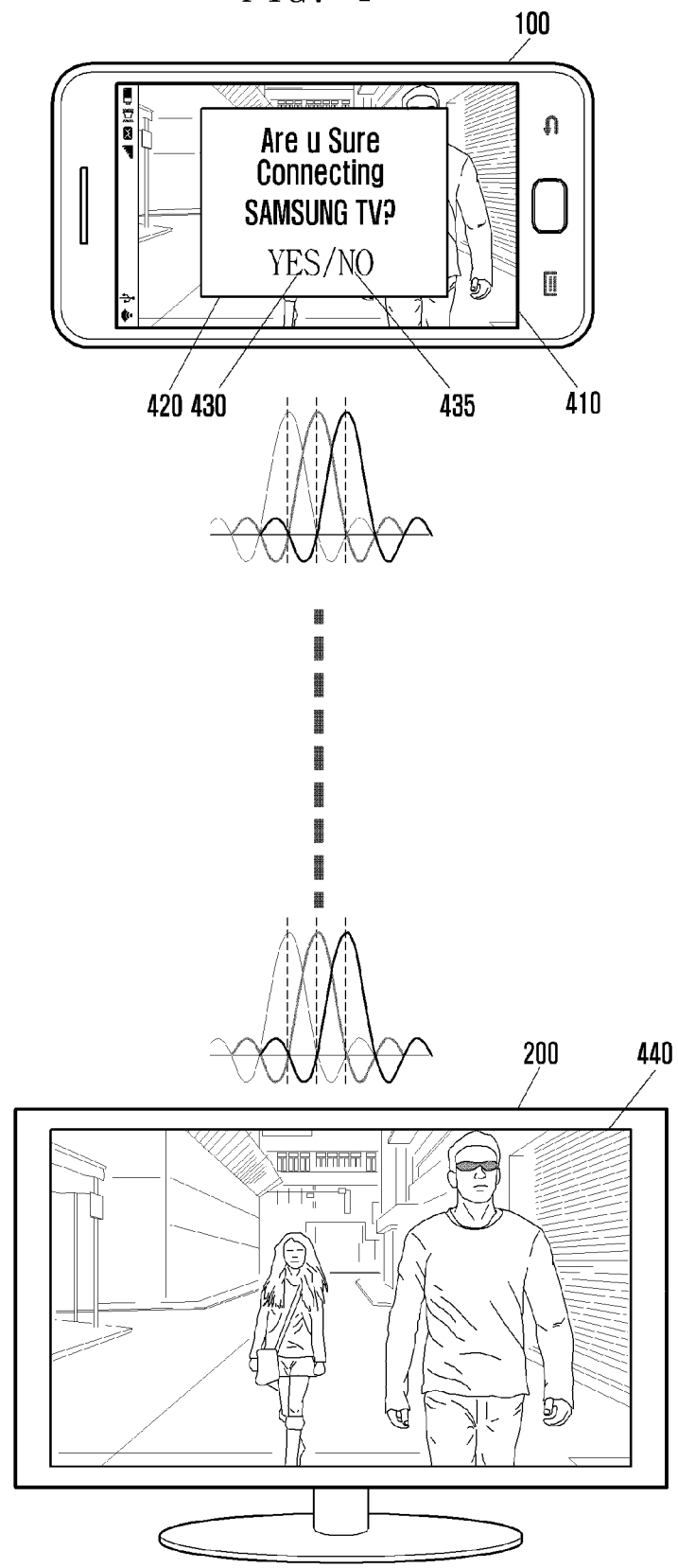
FIG. 4 is a diagram illustrating a working example of a device displaying information associated with devices authorized to receive digital content in accordance with aspects of the present disclosure.

FIG. 4 is a diagram illustrating a working example in which the user device displays the digital content via the recipient device, in accordance with aspects of the present disclosure. In FIG. 4, the user device 100 may display the digital content (e.g. DRM video) 410 on the display unit 110 in response to a user request or in accordance with a predetermined schedule. At this time, the user may execute a data transfer function of the user device 100 for transferring the digital content 410 to another user device (e.g., recipient device 200). The user device 100 or the source device, may execute the HDCP protocol authentication process with the recipient devices within a predetermined radius.

In the example of FIG. 4, the information associated with recipient device 200 may be acquired. In this instance, the user device 100 may control the display unit 110 to display a popup window 420 asking whether to establish a connection with the recipient device 200. The popup window 420 may present the recipient device information and an inquiry message prompting the user to connect. The popup window 420 may also display a "yes" key 430 and a "no" key 435.

The user may check the information associated with the recipient device 200 as a target of the digital content transfer on popup window 420. The user may determine whether to transfer the protected data to recipient device 200.

The user may select the "yes" key 430 in the popup window. In turn, the user device 100 may generate a session key to exchange with the recipient device 200 and may perform the session key authentication procedure. If the session key authentication is successful, the user device 100 transfers the digital content 410 displayed on the screen of display unit 110 to the recipient device 200. The recipient device 200 may display digital content 440 received from the user device 100.

Figure 5:
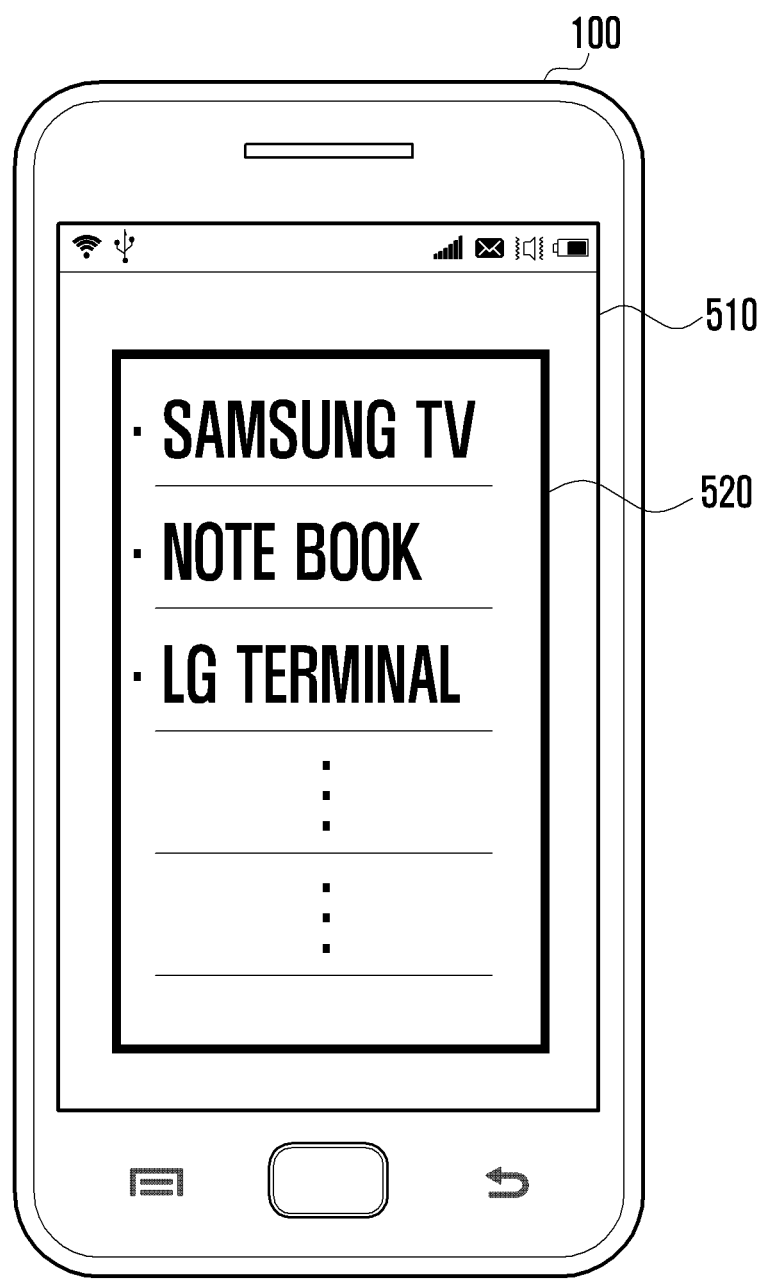
FIG. 5 is a diagram illustrating an example screen display showing device information collected by the user device in accordance with aspects of the present disclosure.

FIG. 5 is a diagram illustrating an example screen display showing the recipient device information collected by the user device in accordance with aspects of the present disclosure. In FIG. 5, the user device 100 may receive the identity information of a plurality of recipient devices authorized to receive digital content. For example, when the user wants to transfer digital content stored in the mobile terminal to a home TV, the mobile terminal may perform the authentication procedure with the recipient devices within a predetermined radius in accordance with HDCP protocol. In this case, there may be a plurality of HDCP-enabled devices in the user's home that pass the first and second authentication procedure. However, there may be additional HDCP-enabled devices outside the user's home that may also pass the first and second authorization procedure (e.g., a neighbor's television set or a neighbor's laptop). That is, there may be devices authorized to receive digital content that a user may not prefer to use. Therefore, the user device may display a recipient device list 520 on screen 510. The user may check the types of recipient devices found within a predetermined radius and select a target recipient device that the user prefers to utilize. If a user selects at least one recipient device, the user device performs the session key authentication process with each selected recipient device and blocks sessions with unselected recipient devices.

Figure 6A:
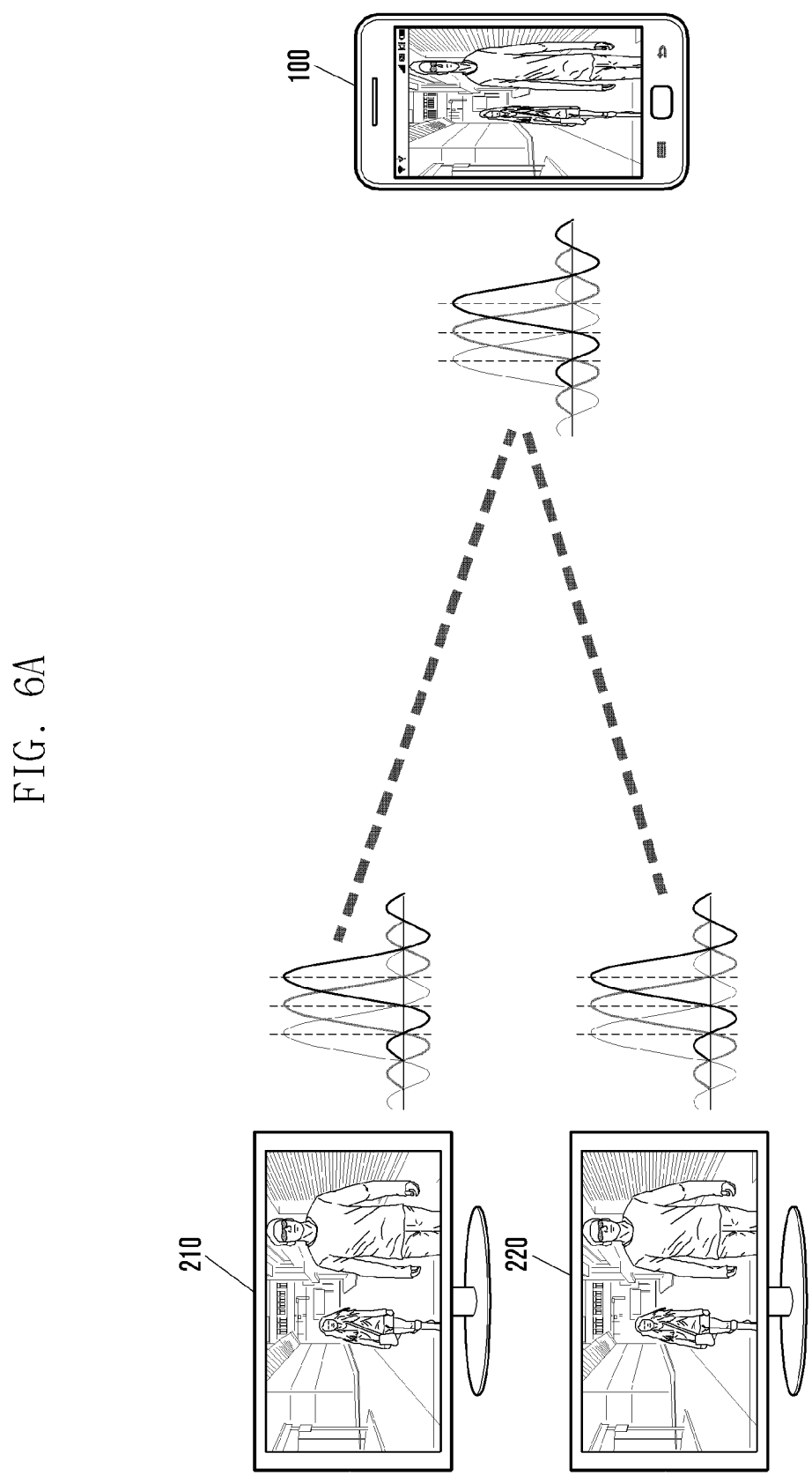
FIG. 6A and FIG. 6B are diagrams illustrating a further working example in accordance with aspects of the present disclosure.
Figure 6B:
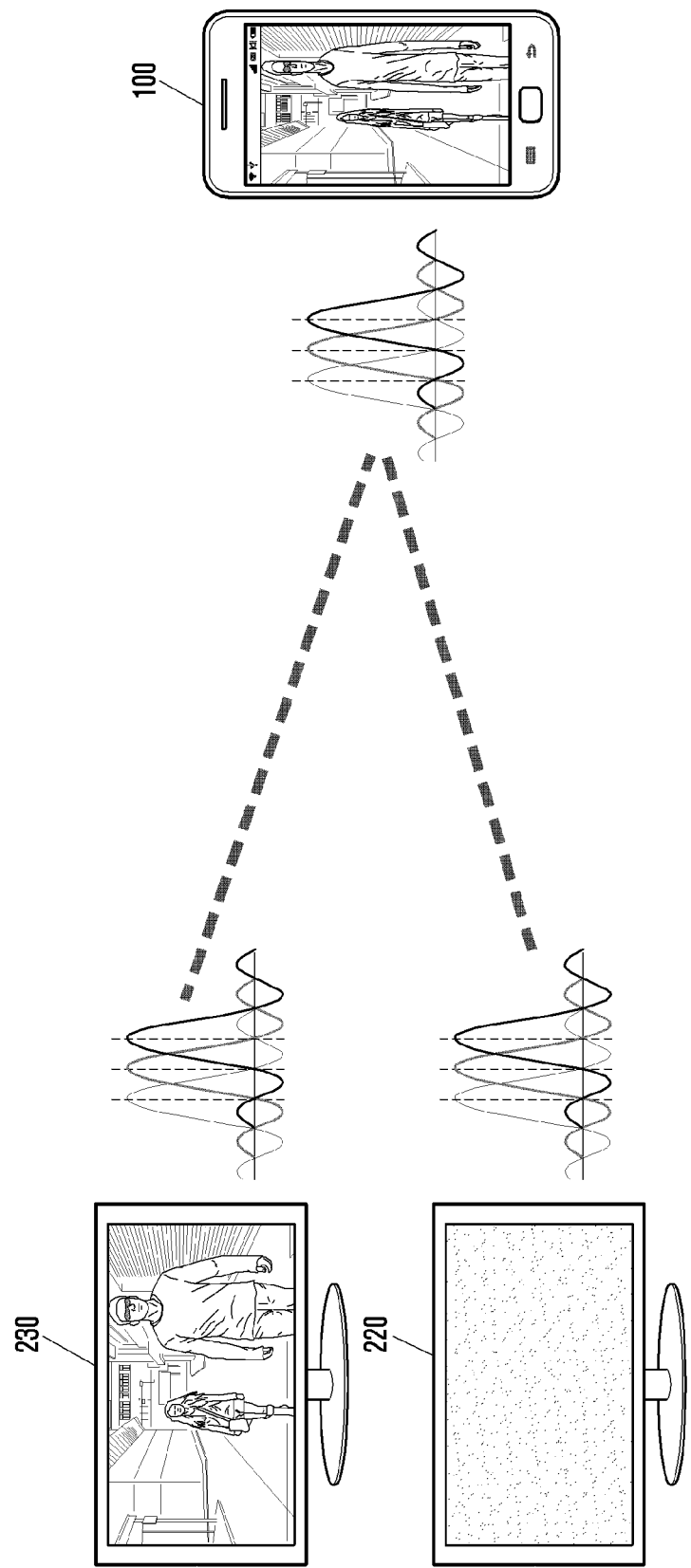

FIGS. 6A and 6B shows a further working example in accordance with aspects of the present disclosure and an example of a conventional method.

In FIGS. 6A and 6B, the user device 100 may perform the authentication process with multiple recipient devices 210 and 220 in compliance with the HDCP protocol. In conventional HDCP protocol-authentication, if a recipient device is found within a predetermined radius through the security key and RTT authentication, the source device deems the recipient device to be authenticated and prepares for transferring the digital content to the authenticated recipient device. In the conventional method, the source device transmits the digital content in OFDM transmission mode such that the recipient devices using the same frequency channel within a predetermined range may be authenticated to receive the digital content.

For example, the user may want to display the screen data of the user device 100 on the screen of the first recipient device 210. The user device 100 may perform authentication, encryption, and update processes in compliance with the HDCP protocol to transmit the digital content to the first recipient device 210. At this time, the conventional HDCP protocol-based authentication procedure may be performed with the unintended second recipient device 220. For example, if the second recipient device 220 is authorized to receive the digital content and is located within a predetermined radius of user device 100, it may pass the authentication. That is, conventional HDCP protocol-based allows digital content to be transferred to unintended recipient devices.

The digital content transmission techniques disclosed herein address this problem by enabling the user device to display information associated with recipient devices within a predetermined radius that are authorized to receive digital content and generates a session key to transmit the digital content to the devices selected by the user and prevents the digital content from being transmitted to unselected devices. Thus, the techniques disclosed herein improve upon HDCP protocol authentication.

As shown in FIG. 6B, the user device 100 may establish a session with recipient device 230 selected by the user to transfer the digital content such that the selected recipient device 230 displays the digital content transmitted by the user device. In this example, recipient device 220 may also be authorized to receive digital content (e.g., it passed the first and second authentication procedures) but it is not selected by the user. Therefore, although a session may be established with recipient device 220 through the first and second authentication process, the user device 100 may prevent transmission of the digital content to the recipient device 220 by not executing the third authentication process therewith. In turn, this prevents the digital content from being transmitted to an unintended recipient device.

Advantageously, the digital content transmission method and apparatus of the present disclosure is capable of preventing transmission of digital content to devices that are not intended to receive the digital content. In this regard, the digital content may be restricted to the intended recipient devices by improving upon conventional authentication protocols. Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. A method for transmitting digital content in an electronic device, the method comprising:
   detecting devices authorized to receive digital content by executing security key exchange authentication, followed by executing Round Trip Time (RTT) signal authentication, the authorized devices being disposed within a predetermined radius of a sender device as detected by the RTT signal authentication; and
   executing authentication on the authorized devices by:
      displaying a list of the authorized devices, receiving an input to the displayed list selecting at least one of the authorized devices from the displayed list,
      in response to the received input selecting the at least one of the authorized devices from the list as a recipient device for displaying the digital content, generating a session key for the selected at least one of the authorized devices, and identifying whether the generated session key corresponds to a local session key generated by and received from the selected at least one of the authorized devices, and
      transmitting digital content encrypted by a HDCP encryption engine to any device in which the generated session key corresponds to the local session key and preventing transmission of digital content to any device lacking a corresponding session key,
   wherein the electronic device is a source device, and displaying the list of authorized devices and receiving the input to the displayed list further comprises:
      displaying the digital content on a local display of the source device while transmitting the digital content encrypted by the HDCP encryption engine to the selected at least one of the authorized devices for display,
      in response to the received input, displaying a pop-up window on the local display overlaying the displayed digital content requesting a confirmation to transmit the digital content to the selected at least one of the authorized devices, and
      generating the session key in response to receiving the requested confirmation.

2. The method of claim 1, further comprising receiving identity information associated with devices authorized to receive digital content, the identity information comprising Extended Display Identification Data (EDID).

3. The method of claim 2, wherein displaying the list of devices further comprises:
   displaying the identity information associated with each device displayed in the list of devices; and
   displaying a message querying whether to connect to a particular device authorized to receive digital content.

4. The method of claim 1, wherein the list of devices comprises a list of information items associated with the devices authorized to receive digital content.

5. The method of claim 1, further comprising identifying which device is associated with a highest priority according to a predetermined rule.

6. The method of claim 1, further comprising:
   generating the session key using a public key of the electronic device and a private key of the selected at least one of the authorized devices;
   transmitting the session key to the selected at least one of the authorized devices;
   receiving a response message from each of the selected at least one of the authorized devices, the response message including the local session key generated by the selected at least one of the authorized devices; and
   establishing a session with the selected at least one of the authorized devices when the received local session key corresponds to the generated session key.

7. The method of claim 1, wherein at least one device lacking a session key is authorized to receive digital content but are not selected.

8. The method of claim 1, wherein the displayed list of the authorized devices includes display of at least one unintended device for which transmission of the digital content is not intended, and executing the authentication on the authorized devices prevents the digital content from being transmitted to the at least one unintended device.

9. An electronic device comprising:
   a communication unit;
   a display unit; and
   at least one processor operatively coupled to memory storing program instructions, the program instructions executable by the at least one processor to:
      detect devices authorized to receive digital content by executing security key exchange authentication followed by Round Trip Time (RTT) signal authentication, the authorized devices being disposed within a predetermined radius of the electronic device as detected by the RTT signal authentication, and
      execute additional authentication on the authorized devices by:
         controlling the display unit to display a list of the authorized devices and receiving an input to the displayed list selecting at least one of the authorized devices from the displayed list,
         in response to the received input selecting the at least one of the authorized devices from the list as a recipient device for displaying the digital content, generate a session key for the selected at least one of the authorized devices, and identify the generated session key corresponds to a local session key generated by and received from the selected at least one of the authorized devices, and
         transmit, using the communication unit, digital content encrypted by a HDCP encryption engine to any device of the authorized devices whose session key corresponds to the local session key, and preventing transmission of the digital content to any device of the authorized devices not containing a corresponding session key, wherein the electronic device is a source device and displaying the list of authorized devices and receiving the input to the displayed list further comprises:

displaying the digital content on the display unit while transmitting the digital content encrypted by the HDCP encryption engine to the selected at least one of the authorized devices for display, in response to the received input, displaying a pop-up window on the display unit overlaying the displayed digital content requesting confirmation to transmit the digital content to the selected at least one of the authorized devices, and generating the session key in response to receiving the requested confirmation.

10. The electronic device of claim 9, wherein the program instructions are further executable by the at least processor to:

detect the devices authorized to receive digital content using a security key authentication module, the security key authentication module to execute the security key exchange authentication and the Round Trip Time (RTT) signal authentication in compliance with High-bandwidth Digital Content Protection (HDCP) protocol;

collect information associated with the devices authorized to receive digital content using a session management module; and generate the session key using a session key management module.

11. The electronic device of claim 9, wherein the program instructions are further executable by the at least processor to: detect the devices authorized to receive digital content using security key exchange authentication and Round Trip Time (RTT) signal authentication.

12. The electronic device of claim 9, wherein the program instructions are further executable by the at least processor to receive Extended Display Identification Data (EDID) from at least one device authorized to receive digital content.

13. The electronic device of claim 9, wherein the program instructions are further executable by the at least processor to:

display, using the display unit, information items associated with the devices authorized to receive digital content; and display a message, using the display unit, the message asking to connect to a device authorized to receive digital content.

14. The electronic device of claim 9, wherein the list of devices comprises a list of information items associated with the devices authorized to receive digital content.

15. The electronic device of claim 9, wherein the program instructions are further executable by the at least processor to:

identify whether a given device authorized to receive digital content has a highest priority in accordance with a predetermined rule; and display, using the display unit, information associated with the given device having the highest priority.

16. The electronic device of claim 9, wherein the program instructions are further executable by the at least processor to:

generate the local session key based on a public key and a private key;

transmit the local session key to a particular selected device;

receive a response message from the particular selected device, the response message comprising a received session key; and establish a session with the particular selected device, when the received session key from the given selected device corresponds to the local session key.

17. The electronic device of claim 9, wherein at least one device not containing the session key is authorized to receive digital content and is not selected.

18. The electronic device of claim 9, wherein the displayed list of the authorized devices includes display of at least one unintended device for which transmission of the digital content is not intended, and executing the authentication on the authorized devices prevents the digital content from being transmitted to the at least one unintended device.

19. A method for transmitting digital content in an electronic device, the method comprising:

detecting devices authorized to receive digital content by executing security key exchange authentication, followed by executing Round Trip Time (RTT) signal authentication, the authorized devices being disposed within a predetermined radius of a sender device as detected by the RTT signal authentication; and executing authentication on the authorized devices by:

displaying a list of the authorized devices, receiving an input to the displayed list selecting at least one of the authorized devices from the displayed list, in response to the received input selecting the at least one of the authorized devices from the list as a recipient device for displaying the digital content, generating a session key for the selected at least one of the authorized devices, and identifying whether the generated session key corresponds to a local session key generated by and received from the selected at least one of the authorized devices, and transmitting digital content encrypted by a HDCP encryption engine to any device in which the generated session key corresponds to the local session key and preventing transmission of digital content to any device lacking a corresponding session key, wherein the electronic device is a source device, and displaying the list of authorized devices and receiving the input to the displayed list further comprises:

displaying the digital content on a local display of the source device while transmitting the digital content encrypted by the HDCP encryption engine to the selected at least one of the authorized devices for display;

in response to the received input, displaying a pop-up window on the local display of the source device overlaying the displayed digital content requesting confirmation to transmit the digital content to the selected at least one of the authorized devices; and generating the session key in response to detecting a confirmation to the displayed pop-up window.

* * * * *